US010789697B2

(12) United States Patent
Krishnan et al.

(10) Patent No.: US 10,789,697 B2
(45) Date of Patent: Sep. 29, 2020

(54) DEVICES, SYSTEMS, AND METHODS FOR SPATIAL-NEIGHBORHOOD CONSISTENCY IN FEATURE DETECTION IN IMAGE DATA

(71) Applicant: Canon Virginia, Inc., Newport News, VA (US)

(72) Inventors: Nikhil Krishnan, Lake Forest, CA (US); Bradley Scott Denney, Irvine, CA (US)

(73) Assignee: Canon Virginia, Inc., Newport News, VA (US)

( * ) Notice: Subject to any disclaimer, the term of this patent is extended or adjusted under 35 U.S.C. 154(b) by 90 days.

(21) Appl. No.: 16/283,495

(22) Filed: Feb. 22, 2019

(65) Prior Publication Data

US 2019/0259142 A1   Aug. 22, 2019

Related U.S. Application Data

(60) Provisional application No. 62/633,702, filed on Feb. 22, 2018.

(51) Int. Cl.
*G06T 7/00* (2017.01)
*G06K 9/46* (2006.01)
*G06K 9/62* (2006.01)

(52) U.S. Cl.
CPC .............. *G06T 7/0002* (2013.01); *G06K 9/46* (2013.01); *G06K 9/623* (2013.01); *G06K 9/628* (2013.01); *G06K 9/6215* (2013.01)

(58) Field of Classification Search
None
See application file for complete search history.

(56) References Cited

U.S. PATENT DOCUMENTS

| 8,203,114 B2 | 6/2012 | Robinson |
| 9,633,108 B2 | 4/2017 | Nachev |
| 9,928,423 B2 | 3/2018 | Datta |
| 2009/0161964 A1* | 6/2009 | Tzur ................... G06K 9/6282 382/203 |
| 2016/0342863 A1* | 11/2016 | Kwon ................. G06F 16/5854 |

(Continued)

OTHER PUBLICATIONS

Yuri Y. Boykov et al., Interactive Graph Cuts for Optimal Boundary & Region Segmentation of Objects in N-D Images, Jul. 2001.

(Continued)

*Primary Examiner* — Dov Popovici
(74) *Attorney, Agent, or Firm* — Canon U.S.A., Inc. IP Division

(57) ABSTRACT

Devices, systems, and methods obtain respective corresponding feature-detection scores for a plurality of areas in an image; calculate respective corresponding sorting scores for at least some areas of the plurality of areas; for the at least some areas of the plurality of areas, arrange the corresponding feature-detection scores in order of the corresponding sorting scores, thereby generating an order of sorted feature-detection scores; and assign respective detection scores to the at least some areas based on the order of sorted feature-detection scores and on three or more of the following: the respective corresponding feature-detection scores of the areas, a spectral threshold, a spatial threshold, and a neighborhood kernel.

19 Claims, 8 Drawing Sheets

(56) References Cited

U.S. PATENT DOCUMENTS

2017/0193078 A1  7/2017  Limonad

OTHER PUBLICATIONS

Jonathan Krause, Lecture 2: Introduction to Segmentation, Apr. 2015.
Haichang Li et al., A label propagation method using spatial-spectral consistency for hyperspectral image classification, Jan. 4, 2016.
James M. Murphy et al., Nonlinear Unsupervised Clustering of Hyperspectral Images with Applications to Anomaly Detection and Active Learning, Sep. 13, 2017.
James M. Murphy et al., Unsupervised Clustering and Active Learning of Hyperspectral Images with Nonlinear Diffusion, version 5, Oct. 15, 2018.
Jian Yang et al., Brain Activation Detection by Neighborhood One-Class SVM, Mar. 2010.
Manqi Zhao et al., Anomaly Detection with Score functions based on Nearest Neighbor Graphs, Dec. 2009.

* cited by examiner

|   |   |   |   |   |   |   |
|---|---|---|---|---|---|---|
| 87 $x_1$ | 96 $x_2$ | 93 $x_3$ | 64 $x_4$ | 57 $x_5$ | 72 $x_6$ | 45 $x_7$ |
| 85 $x_8$ | 76 $x_9$ | 34 $x_{10}$ | 22 $x_{11}$ | 32 $x_{12}$ | 61 $x_{13}$ | 76 $x_{14}$ |
| 71 $x_{15}$ | 22 $x_{16}$ | 55 $x_{17}$ | 47 $x_{18}$ | 90 $x_{19}$ | 50 $x_{20}$ | 66 $x_{21}$ |
| 70 $x_{22}$ | 74 $x_{23}$ | 79 $x_{24}$ | 87 $x_{25}$ | 81 $x_{26}$ | 60 $x_{27}$ | 48 $x_{28}$ |
| 39 $x_{29}$ | 12 $x_{30}$ | 71 $x_{31}$ | 70 $x_{32}$ | 54 $x_{33}$ | 33 $x_{34}$ | 41 $x_{35}$ |
| 08 $x_{36}$ | 11 $x_{37}$ | 26 $x_{38}$ | 46 $x_{39}$ | 51 $x_{40}$ | 68 $x_{41}$ | 81 $x_{42}$ |
| 09 $x_{43}$ | 31 $x_{44}$ | 43 $x_{45}$ | 53 $x_{46}$ | 59 $x_{47}$ | 70 $x_{48}$ | 85 $x_{49}$ |

FIG. 3A

$X_{sort}$ $x_2$: 46
$x_3$: 43
$x_{36}$: 42
$x_{43}$: 41
$x_{19}$: 40
$x_{37}$: 39
$x_{30}$: 38
$x_1$: 37
$x_{25}$: 37
$x_8$: 35
$x_{49}$: 35
...
$x_{46}$: 3
$x_{18}$: 3
$x_{28}$: 2
$x_{40}$: 1
$x_{20}$: 0

FIG. 3B

|   |   |   |   |   |   |   |
|---|---|---|---|---|---|---|
| A $x_1$ | A $x_2$ | A $x_3$ | $x_4$ | $x_5$ | $x_6$ | $x_7$ |
| A $x_8$ | $x_9$ | $x_{10}$ | $x_{11}$ | $x_{12}$ | $x_{13}$ | $x_{14}$ |
| $x_{15}$ | $x_{16}$ | $x_{17}$ | $x_{18}$ | A $x_{19}$ | $x_{20}$ | $x_{21}$ |
| $x_{22}$ | $x_{23}$ | $x_{24}$ | A $x_{25}$ | $x_{26}$ | $x_{27}$ | $x_{28}$ |
| $x_{29}$ | N $x_{30}$ | $x_{31}$ | $x_{32}$ | $x_{33}$ | $x_{34}$ | $x_{35}$ |
| N $x_{36}$ | N $x_{37}$ | $x_{38}$ | $x_{39}$ | $x_{40}$ | $x_{41}$ | $x_{42}$ |
| N $x_{43}$ | $x_{44}$ | $x_{45}$ | $x_{46}$ | $x_{47}$ | $x_{48}$ | A $x_{49}$ |

FIG. 3C

| 87 $x_1$ | 96 $x_2$ | 93 $x_3$ | 64 $x_4$ | 57 $x_5$ | 72 $x_6$ | 45 $x_7$ |
|---|---|---|---|---|---|---|
| 85 $x_8$ | 76 $x_9$ | 34 $x_{10}$ | 22 $x_{11}$ | 32 $x_{12}$ | 61 $x_{13}$ | 76 $x_{14}$ |
| 71 $x_{15}$ | 22 $x_{16}$ | 55 $x_{17}$ | 47 $x_{18}$ | 90 $x_{19}$ | 50 $x_{20}$ | 66 $x_{21}$ |
| 70 $x_{22}$ | 74 $x_{23}$ | 79 $x_{24}$ | 87 $x_{25}$ | 81 $x_{26}$ | 60 $x_{27}$ | 48 $x_{28}$ |
| 39 $x_{29}$ | 12 $x_{30}$ | 71 $x_{31}$ | 70 $x_{32}$ | 54 $x_{33}$ | 33 $x_{34}$ | 41 $x_{35}$ |
| 08 $x_{36}$ | 11 $x_{37}$ | 26 $x_{38}$ | 46 $x_{39}$ | 51 $x_{40}$ | 68 $x_{41}$ | 81 $x_{42}$ |
| 09 $x_{43}$ | 31 $x_{44}$ | 43 $x_{45}$ | 53 $x_{46}$ | 59 $x_{47}$ | 70 $x_{48}$ | 85 $x_{49}$ |

FIG. 6A

| A $x_1$ | A $x_2$ | A $x_3$ | $x_4$ | $x_5$ | $x_6$ | $x_7$ |
|---|---|---|---|---|---|---|
| A $x_8$ | $x_9$ | $x_{10}$ | $x_{11}$ | $x_{12}$ | $x_{13}$ | $x_{14}$ |
| $x_{15}$ | $x_{16}$ | $x_{17}$ | $x_{18}$ | A $x_{19}$ | $x_{20}$ | $x_{21}$ |
| $x_{22}$ | $x_{23}$ | $x_{24}$ | A $x_{25}$ | A $x_{26}$ | $x_{27}$ | $x_{28}$ |
| $x_{29}$ | N $x_{30}$ | $x_{31}$ | $x_{32}$ | $x_{33}$ | $x_{34}$ | $x_{35}$ |
| N $x_{36}$ | N $x_{37}$ | $x_{38}$ | $x_{39}$ | $x_{40}$ | $x_{41}$ | A $x_{42}$ |
| N $x_{43}$ | $x_{44}$ | $x_{45}$ | $x_{46}$ | $x_{47}$ | $x_{48}$ | A $x_{49}$ |

FIG. 6B

$X_{sort}$ $x_{24}$: 29
$x_{11}$: 28
$x_{16}$: 28
$x_9$: 26
$x_{14}$: 26
...
$x_{46}$: 3
$x_{18}$: 3
$x_{28}$: 2
$x_{40}$: 1
$x_{20}$: 0

FIG. 6C

| A $x_1$ | A $x_2$ | A $x_3$ | $x_4$ | $x_5$ | $x_6$ | $x_7$ |
|---|---|---|---|---|---|---|
| A $x_8$ | A $x_9$ | $x_{10}$ | N $x_{11}$ | $x_{12}$ | $x_{13}$ | A $x_{14}$ |
| $x_{15}$ | N $x_{16}$ | $x_{17}$ | $x_{18}$ | A $x_{19}$ | $x_{20}$ | $x_{21}$ |
| $x_{22}$ | $x_{23}$ | A $x_{24}$ | A $x_{25}$ | A $x_{26}$ | $x_{27}$ | $x_{28}$ |
| $x_{29}$ | N $x_{30}$ | $x_{31}$ | $x_{32}$ | $x_{33}$ | $x_{34}$ | $x_{35}$ |
| N $x_{36}$ | N $x_{37}$ | $x_{38}$ | $x_{39}$ | $x_{40}$ | $x_{41}$ | A $x_{42}$ |
| N $x_{43}$ | $x_{44}$ | $x_{45}$ | $x_{46}$ | $x_{47}$ | $x_{48}$ | A $x_{49}$ |

FIG. 6D

DEVICES, SYSTEMS, AND METHODS FOR SPATIAL-NEIGHBORHOOD CONSISTENCY IN FEATURE DETECTION IN IMAGE DATA

CROSS-REFERENCE TO RELATED APPLICATIONS

This application claims the benefit of U.S. Application No. 62/633,702, which was filed on Feb. 22, 2018.

BACKGROUND

Technical Field

This application generally concerns computer vision that detects features in images.

Background

Computer-vision systems can detect visual features in images. For example, nondestructive computer-vision testing techniques can be used to examine the properties of objects without causing damage to the objects. These techniques can be used in a quality-control process to identify defects in the object.

SUMMARY

Some embodiments of a device comprise one or more computer-readable storage media and one or more processors. The one or more processors are configured to cause the device to perform operations that include obtaining respective corresponding feature-detection scores for a plurality of areas in an image; calculating respective corresponding sorting scores for at least some areas of the plurality of areas; for the at least some areas of the plurality of areas, arranging the corresponding feature-detection scores in order of the corresponding sorting scores, thereby generating an order of sorted feature-detection scores; and assigning respective detection scores to the at least some areas based on the order of sorted feature-detection scores and on three or more of the following: the respective corresponding feature-detection scores of the areas, a spectral threshold, a spatial threshold, and a neighborhood kernel.

Some embodiments of a method comprise obtaining respective corresponding feature-detection scores for a plurality of areas in an image; calculating respective corresponding sorting scores for at least some areas of the plurality of areas; sorting the corresponding feature-detection scores of the at least some areas in order of their respective corresponding sorting scores, thereby generating a list of sorted feature-detection scores; and assigning respective detection labels to the at least some areas based on the list of sorted feature-detection scores and on two or more of the following: the respective corresponding feature-detection scores of the areas, a spectral threshold, a spatial threshold, and a neighborhood kernel.

Some embodiments of one or more computer-readable storage media store computer-executable instructions that, when executed by one or more computing devices, cause the one or more computing device to perform operations that comprise obtaining respective corresponding feature-detection scores for a plurality of areas in an image; calculating respective corresponding sorting scores for at least some areas of the plurality of areas; sorting the corresponding feature-detection scores of the at least some areas in order of their corresponding sorting scores, thereby generating list of sorted feature-detection scores; and assigning respective detection labels to the at least some areas based on the list of sorted feature-detection scores and on three or more of the following: the respective corresponding feature-detection scores of the areas, a spectral threshold, a spatial threshold, and a neighborhood kernel.

BRIEF DESCRIPTION OF THE DRAWINGS

FIG. 3A illustrates an example embodiment of a part of an image that includes forty-nine areas (e.g., pixels), as well as the respective feature-detection scores of the areas.

FIG. 3B illustrates an example embodiment of a list of the areas from FIG. 3A in which the areas have been sorted according to the absolute values of the differences between their respective feature-detection scores and a threshold.

FIG. 3C illustrates an example embodiment of labels that have been assigned to the first eleven areas in the list in FIG. 3B after the first eleven iterations of the operations in block B240 in FIG. 2.

FIG. 6A illustrates an example embodiment of a part of an image that includes forty-nine areas (e.g., pixels), as well as the respective feature-detection scores of the areas.

FIG. 6B illustrates an example embodiment of the labels that have been assigned to the areas from FIG. 6A that have feature-detection scores that do not fall within the no-decision range.

FIG. 6C illustrates an example embodiment of a list of the unlabeled areas from FIG. 6B.

FIG. 6D illustrates an example embodiment of labels that have been assigned to the first five areas in the list in FIG. 6C after the first five iterations of the operations in block B540.

DESCRIPTION

The following paragraphs describe certain explanatory embodiments. Other embodiments may include alternatives, equivalents, and modifications. Additionally, the explanatory embodiments may include several novel features, and a particular feature may not be essential to some embodiments of the devices, systems, and methods that are described herein.

Figure 1:
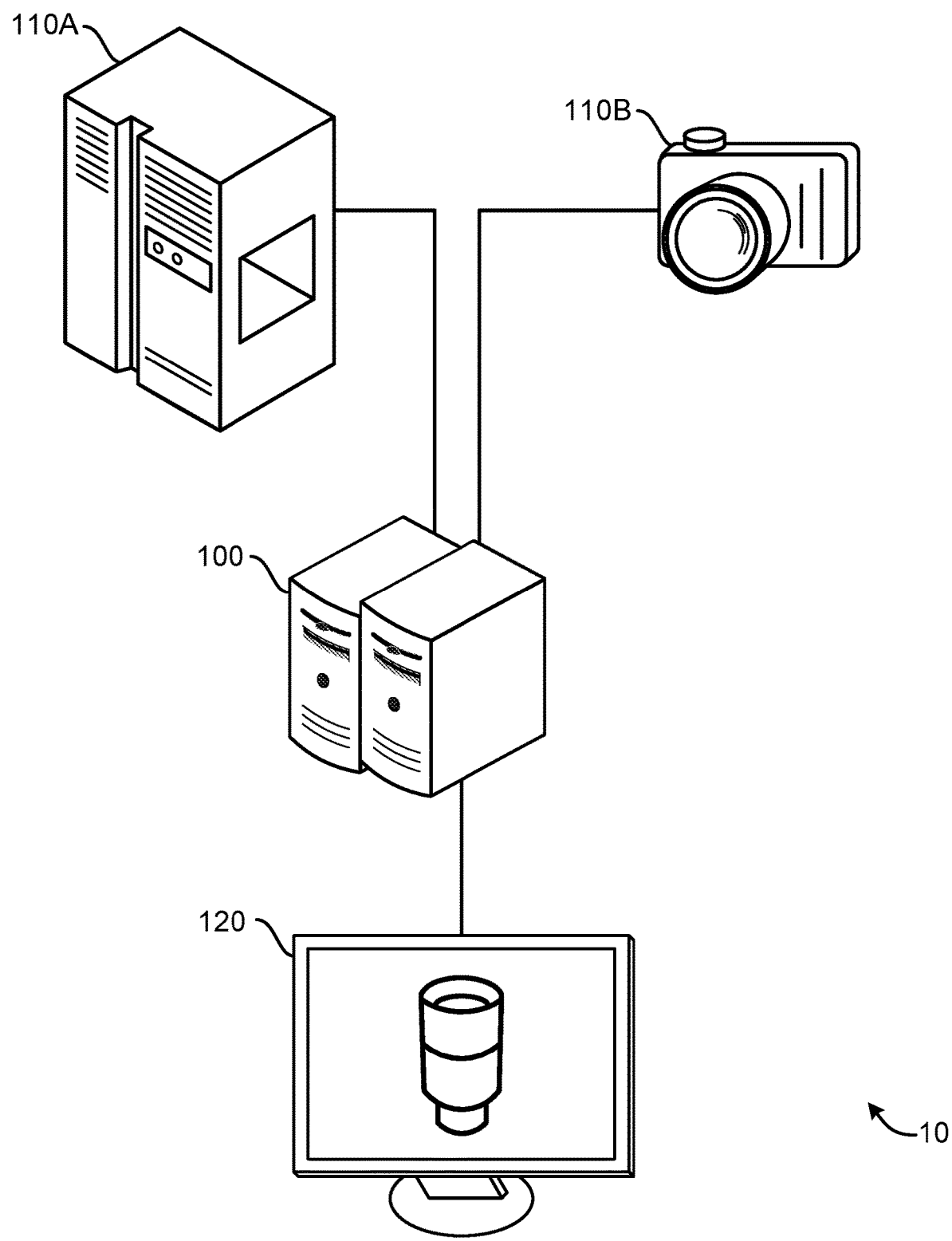
FIG. 1 illustrates an example embodiment of a system for image-feature detection.

FIG. 1 illustrates an example embodiment of a system for image-feature detection. The system 10 includes one or more detection devices 100, which are specially-configured computing devices; one or more image-capturing devices, such as an x-ray detector 110A or a camera 110B; and at least one display device 120.

The one or more detection devices 100 are configured to obtain one or more images of an object from one or both of the image-capturing devices. The one or more detection devices 100 are also configured to detect features (e.g., defects, anomalies, outliers) in the one or more images of the object. The features may indicate defects or anomalies in the object that is depicted by the image. The one or more detection devices 100 can detect the features at a scale that may be as small as a pixel. Also, the scale may be larger than one pixel (e.g., a group of pixels).

Some embodiments of the one or more detection devices 100 detect the features in an image using one or more classifiers that output scores or other measures that indicate whether an area (e.g., a single pixel, a group of pixels) has a particular feature based on one or more visual characteristics (e.g., color, luminance) of the area. For example, the scores may indicate a probability or a distance measure. Also for example, the score may indicate a higher confidence or probability that an area has a feature, a lower confidence or probability that an area has a feature, a higher confidence or probability that an area does not have a feature, or a lower confidence or probability that an area does not have a feature.

Some embodiments of the one or more detection devices 100 detect the features using one or more classifiers that have a continuous-score output. Thus, the score or measure may include the continuous or discrete values within a range. For example, in some embodiments the range of the detection scores is 0 to 100, where 0 indicates a high confidence that an area does not have an anomaly, and where 100 indicates a high confidence that an area has an anomaly. Also, the detection score for an area may not depend on the scores of any neighboring areas.

The one or more detection devices 100 may also use the spatial neighborhoods in an image to provide a consistent detection result in spatially-adjacent portions of the image. Some features in an image tend to be local. For example, if a pixel is categorized as a defect, it is sometimes more likely that the neighboring pixel has a defect than if the pixel is not categorized as a defect. Using the spatial-neighborhood information can improve the performance of feature detection, for example by removing isolated wrongly-categorized defects (reduce false positives) and by increasing the detection-coverage area (increase true positives).

When anomalous areas are detected (for example if a pixel's predictive error is larger than t standard deviations from the mean), it may be useful to consult neighboring areas in addition to a fixed area-wise defect-detection threshold. For border-line cases, the state of the neighboring areas may help inform the state of the area in question. For example, if many neighboring areas have clearly been detected as anomalous, then the borderline case of the area in question can be determined to be an anomaly as well. Conversely, if the neighboring areas appear to be mostly normal, then the area in question may be determined to be normal.

Figure 2:
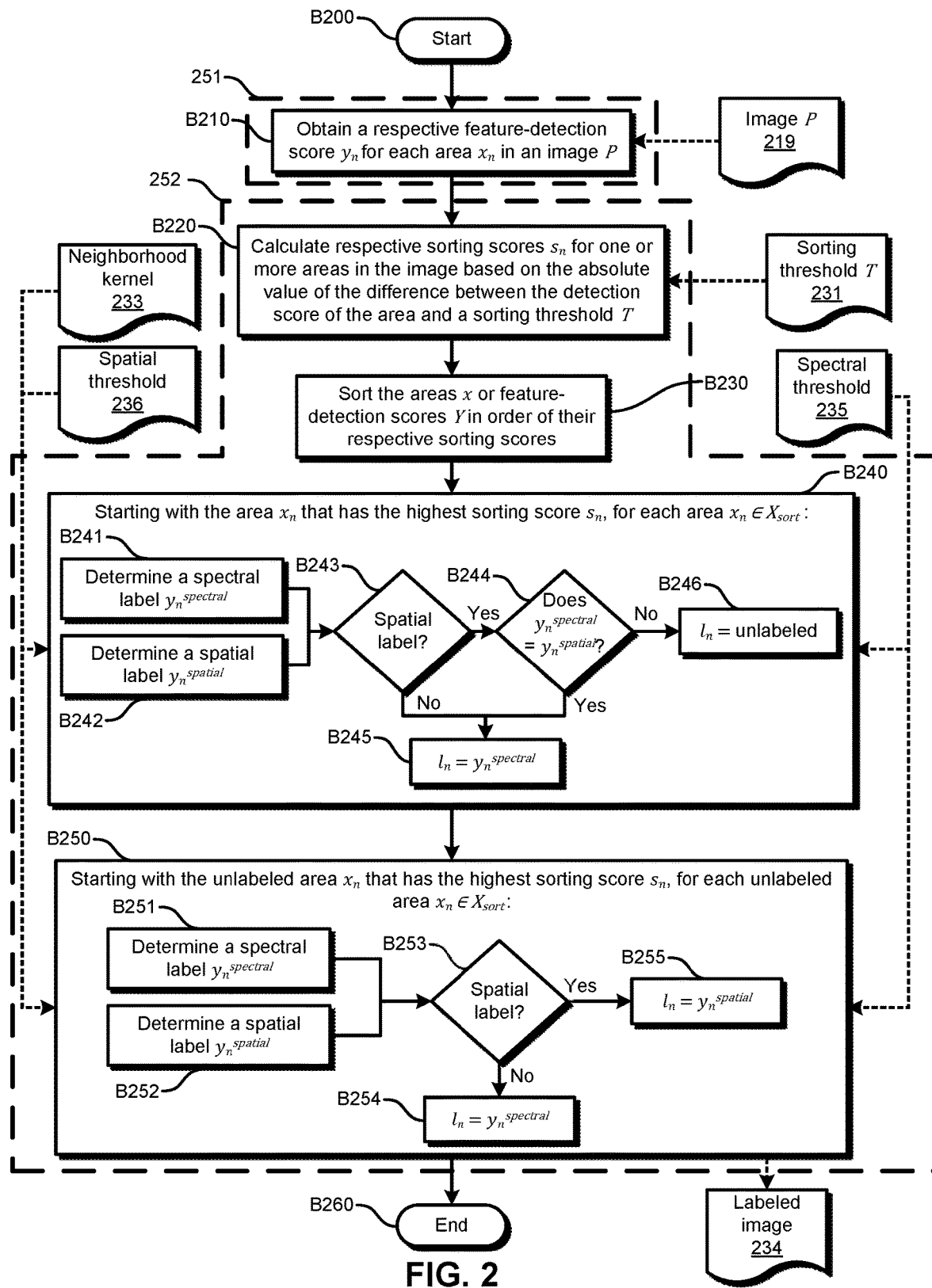
FIG. 2 illustrates an example embodiment of an operational flow for image-feature detection.

FIG. 2 illustrates an example embodiment of an operational flow for image-feature detection. Although this operational flow and the other operational flows that are described herein are presented in a certain order, some embodiments of these operational flows perform at least some of the operations in different orders than the presented orders. Examples of different orders include concurrent, parallel, overlapping, reordered, simultaneous, incremental, and interleaved orders. Also, some embodiments of these operational flows include operations from more than one of the embodiments that are described herein. Thus, some embodiments of the operational flows may omit blocks, add blocks, change the order of the blocks, combine blocks, or divide blocks into more blocks relative to the example embodiments of the operational flows that are described herein.

Furthermore, although the embodiments of the operational flows that are described herein are performed by a detection device, some embodiments of these operational flows are performed by two or more detection devices or by one or more other specially-configured computing devices.

The operational flow in FIG. 2 starts in block B200 and then moves to block B210, where the detection device obtains a respective feature-detection $y_n$ score for each area $x_n$ (e.g., an area may be an individual pixel, an area may include a group of pixels) in an image P 219:

$$P=\{p_n=I(x_n)\}_{n=1}^{N},$$

where $p_n$ is the image value (e.g., a pixel value, such as a luminance value) of the area $x_n$; where $I(\ )$ is a function that maps an area $x_n$ to its image value $p_n$; where N is the total number of areas x in the image P 219; and where each area $x_n$ is defined as $$x_n \in X=\{x_n=(r_n,c_n)\}_{n=1}^{N},$$

where $r_n$ is the row location of the $n^{th}$ area, and where $c_n$ is the column location of the $n^{th}$ area.

The feature-detection scores $y_n$ may be described by the set $$Y=\{y_n=L(P,x_n)\}=1^N,$$

where $L(\ )$ is a function that maps or assigns a feature-detection score to an area $x_n$ based on the image P 219. In some embodiments, $L(\ )$ is a pixel-wise continuous-output classifier (e.g., a defect classifier, an anomaly classifier), which may be a trained one-class classifier or a trained binary classifier. For ease of reading, this example embodiment uses only one class, and a threshold is set to differentiate the normal class from an anomaly class.

Some embodiments of the detection device obtain the image P 219 (e.g., from an image-capturing device, from a storage device) and then generate (e.g., calculate) the feature-detection scores Y based on the image P 219, for example by inputting the image P 219 into one or more classifiers, and one or more of the classifiers may be a respective trained neural network. And some embodiments of the detection device obtain the feature-detection scores Y from other devices that generated the feature-detection scores Y based on the image P 219.

Next, in block B220, the detection device calculates respective sorting scores $s_n$ for one or more areas $x_n$ in the image P 219. In this example embodiment, the detection device calculates the respective sorting score $s_n$ for an area $x_n$ in the image P 219 by calculating the absolute value of the difference between the feature-detection score $y_n$ of the area $x_n$ and a sorting threshold T 231:

$$s_n=|y_n-T|.$$

In some embodiments, the detection device calculates the sorting threshold T 231, and in some embodiments the detection device obtains the sorting threshold T 231 from a user input. The sorting threshold T 231 may also be predefined in a storage in the detection device.

The flow then moves to block B230, where the detection device sorts the areas x or their feature-detection scores Y in descending (or ascending) order of their respective sorting scores $s_n$, thereby generating a sorted list $X_{sort}$.

Next, in block B240, starting with the area $x_n$ that has the highest sorting score $s_n$ in the sorted list $X_{sort}$ and moving through the sorted list $X_{sort}$ in descending order of sorting scores $s_n$, the detection device performs at least some of the operations in blocks B241-B246 for each area $x_n$. In block B241, the detection device determines a spectral label $y_n^{spectral}$ for the area $x_n$ based on the feature-detection score $y_n$ of the area $x_n$ and on a spectral threshold 235 (which may or may not be identical to the sorting threshold T 231). For example, if the feature-detection score $y_n$ indicates the distance from the area's visual characteristics to the normal class, then, if the feature-detection score $y_n$ is above the spectral threshold 235, the detection device assigns an abnormal (e.g., defect, outlier, anomaly) spectral label to the area $x_n$. Otherwise, the detection device assigns a normal spectral label to the area $x_n$. Also for example, if the feature-detection score $y_n$ indicates the probability that the area $x_n$ belongs to the normal class, then, if the feature-detection score $y_n$ is below the spectral threshold 235, the detection device assigns an abnormal (e.g., defect, outlier, anomaly) spectral label $y_n^{spectral}$ to the area $x_n$. Otherwise, the detection device assigns a normal spectral label $y_n^{spectral}$ to the area $x_n$.

Additionally, in block B242, the detection device determines whether to assign a spatial label $y_n^{spatial}$ to the area $x_n$ based on one or more criteria (e.g., a spatial threshold 236). If the area $x_n$ satisfies the one or more criteria of a spatial label $y_n^{spatial}$, then the detection device assigns the spatial label $y_n^{spatial}$ to the area $x_n$. For example, in some embodiments, if the number of areas x within a neighborhood (which is defined by a neighborhood kernel 233) of the area $x_n$ that have the same assigned detection label $l_n$ exceeds a spatial threshold 236, then the detection device assigns the detection label $l_n$ to the area $x_n$ as the area's spatial label $y_n^{spatial}$. Otherwise, the detection device does not assign a spatial label $y_n^{spatial}$ to the area $x_n$. For example, in some embodiments, if there is no detection label $l_n$ for which the number of areas within the neighborhood of the area $x_n$ that have been assigned the detection label $l_n$ exceeds the spatial threshold 236, then the detection device does not assign a spatial label $y_n^{spatial}$ to the area $x_n$.

In some embodiments, the neighborhood is defined by a neighborhood kernel 233. For example, the neighborhood kernel 233 may define the neighborhood to be the 8 pixels that surround an area $x_n$ (the neighborhood is the 3×3 region around the area), and the spatial threshold 236 may be 4. Also for example, the neighborhood may be a 5×5 region that is centered on the area $x_n$, and the spatial threshold 236 may be 12.

From blocks B241 and B242, the flow moves to block B243. In block B243, the detection device determines if a spatial label $y_n^{spatial}$ has been assigned to the area $x_n$. If the detection device determines that a spatial label $y_n^{spatial}$ has not been assigned to the area $x_n$ (block B243=No), then the flow moves to block B245, where the detection device assigns the spectral label $y_n^{spectral}$ to the area $x_n$ as the area's detection label $l_n$.

If in block B243 the detection device determines that a spatial label $y_n^{spatial}$ has been assigned to the area (block B243=Yes), then the flow moves to block B244. In block B244, the detection device determines whether the spectral label $y_n^{spectral}$ of the area $x_n$ is identical to the spatial label $y_n^{spatial}$ of the area $x_n$. If they are identical (block B244=Yes), then the flow moves to block B245. If they are not identical (block B244=No), then the flow moves to block B246. In block B246, the detection device leaves the detection label $l_n$ of the area $x_n$ as unlabeled or assigns an "unlabeled" or null label to the area $x_n$.

During the first iterations of the operations in blocks B240, the detection device operates on the areas x that have the highest sorting scores s, which correspond to the feature-detection scores y that are furthest from the sorting threshold T 231 in either direction (i.e., higher or lower) of the sorting threshold. This may indicate a high confidence that these areas can be correctly labeled based on only their respective spectral labels $y^{spectral}$. The later iterations will be operating on the areas x that have lower sorting scores s, which correspond to the feature-detection scores y that are closer to the sorting threshold T 231. This may indicate a lower confidence that these areas x can be correctly labeled based on only their respective spectral labels $y^{spectral}$. Because the areas x that have the highest sorting scores s will have already been assigned a respective detection label l (which is based on their spectral labels $y^{spectral}$), the detection device can use the detection labels l of these high-confidence (or high probability) areas x to determine the spatial labels $y^{spatial}$ of the areas x that have lower sorting scores s. Accordingly, the spatial labels $y^{spatial}$ of the areas x that have lower sorting scores s are based on the higher-confidence spectral labels $y^{spectral}$ of the areas x that have higher sorting scores s.

After block B240, the flow proceeds to block B250. In block B250, starting with the unlabeled area $x_n$ that has the highest sorting score $s_n$ in the sorted list $X_{sort}$ and moving through the unlabeled areas x in the sorted list $X_{sort}$ in descending order of sorting scores 5, the detection device performs one or more of the operations in blocks B251-B255 for each unlabeled area $x_n$. As used herein, an "unlabeled area" is an area that does not have an assigned detection label or an area that has an "unlabeled" or null detection label.

In block B251, the detection device determines a spectral label $y_n^{spectral}$ for the area $x_n$ based on the feature-detection score $y_n$ of the area $x_n$ and on the spectral threshold 235. Also, the detection device may omit block B251 and reuse the area's spectral label $y_n^{spectral}$ from block B241.

Additionally, in block B252, the detection device determines whether to assign a spatial label $y_n^{spatial}$ to the area $x_n$ based on one or more criteria (e.g., a spatial threshold 236). If the area $x_n$ satisfies the one or more criteria of a spatial label $y_n^{spatial}$ then the detection device assigns the spatial label $y_n^{spatial}$ to the area $x_n$. For example, in some embodiments, if the number of areas within a neighborhood of the area $x_n$ that have the same assigned detection label $l_n$ exceeds a spatial threshold 236, then the detection device assigns the detection label $l_n$ to the area $x_n$ as the area's spatial label $y_n^{spatial}$. Otherwise, the detection device does not assign a spatial label $y_n^{spatial}$ to the area $x_n$. For example, in some embodiments if there is no detection label $l_n$ for which the number of areas within the neighborhood of the area $x_n$ that have been assigned the detection label $l_n$ exceeds the spatial threshold 233, then the detection device does not assign a spatial label $y_n^{spatial}$ to the area $x_n$.

From blocks B251 and B252, the flow moves to block B253. In block B253, the detection device determines if a spatial label $y_n^{spatial}$ has been assigned to the area $x_n$. If the detection device determines that a spatial label $y_n^{spatial}$ has not been assigned to the area $x_n$ (block B253=No), then the flow moves to block B254, where the detection device assigns the spectral label $y_n^{spectral}$ to the area $x_n$ as the area's detection label $l_n$. If the detection device determines that a spatial label $y_n^{spatial}$ has been assigned to the area $x_n$ (block B253=Yes), then the flow moves to block B255, where the detection device assigns the spatial label $y_n^{spatial}$ to the area $x_n$ as the area's detection label $l_n$.

Finally, after the operations in block B250 have been performed on all of the unlabeled areas, the detection device outputs a labeled image 234 that includes the assigned detection labels l. Following block B250, the flow ends in block B260.

Also, in some embodiments, the detection device implements the operations in block B210 in a defect classifier 251, and the detection device implements the operations in blocks B220-B250 in a neighborhood-consistency classifier 252.

FIG. 3A illustrates an example embodiment of a part of an image that includes forty-nine areas (e.g., pixels), as well as the respective feature-detection scores of the areas. FIG. 3B illustrates an example embodiment of a list of the areas from FIG. 3A in which the areas have been sorted according to the absolute values of the differences between their respective feature-detection scores and a threshold of 50. Consequently, areas $x_2$ (detection score: 96), $x_3$ (detection score: 93), and $x_{36}$ (detection score: 8) are the first three areas in the list. FIG. 3C illustrates an example embodiment of the detection labels that have been assigned to the first eleven areas in the list in FIG. 3B after the first eleven iterations of block B240 in FIG. 2. In this embodiment, "N" indicates normal, "A" indicates abnormal, and blank indicates unlabeled.

Figure 4:
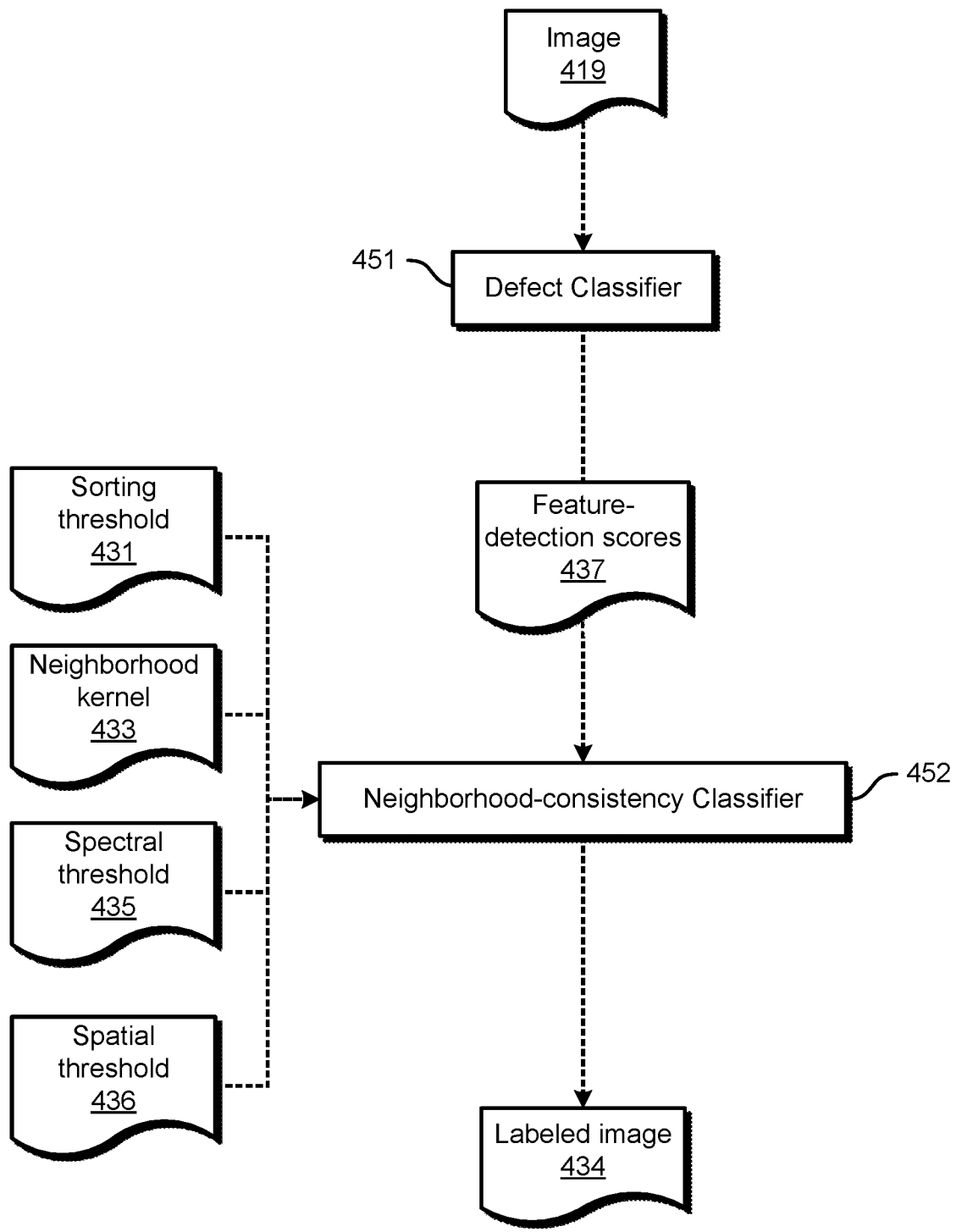
FIG. 4 illustrates an example embodiment of a functional configuration of a detection device.

FIG. 4 illustrates an example embodiment of a functional configuration of a detection device. The functional configuration may be implemented by hardware (e.g., customized circuitry) or by both hardware and software. The detection device includes a defect classifier 451 and a neighborhood-consistency classifier 452. The defect classifier 451 receives an image 419 as an input, generates respective feature-detection scores 437 for the areas in the image based on the image, and outputs the feature-detection scores 437 for the areas in the image 419. The defect classifier 451 may be a continuous-output defect classifier. Some embodiments of the defect classifier 451 implement the operations that are performed in block B210 in FIG. 2, block B510 in FIG. 5, or in block B710 in FIG. 7.

The neighborhood-consistency classifier 452 receives the feature-detection scores 437, and also receives one or more of the following other inputs: a sorting threshold 431, a neighborhood kernel 433 (which defines a size or a shape of a neighborhood), a spectral threshold 435, and a spatial threshold 436. For example, the neighborhood-consistency classifier 452 may receive the sorting threshold 431, the neighborhood kernel 433, the spectral threshold 435, and the spatial threshold 436 from a storage device, from another computing device that communicates with the detection device, from the output of an operation that was performed by the detection device, or from one or more user inputs. Then, based on the received inputs, the neighborhood-consistency classifier 452 generates a labeled image 434. When generating the labeled image 434, the neighborhood-consistency classifier 452 assigns a respective detection label to each area that may account for spatial consistency in the neighborhood of that area.

Some embodiments of the neighborhood-consistency classifier 452 define a detection-score interval around a selected threshold (e.g., sorting threshold) for which no labeling decision is initially taken, for example due to proximity to a threshold (e.g., the sorting threshold). Later, these unlabeled areas are assigned a detection label if a sufficient number (e.g., a majority) of neighborhood areas (areas in the neighborhood) have that detection label. If there is not a detection label that is held by a sufficient number of neighborhood areas, then a detection label may be assigned, for example, based on whether the feature-detection score is above or below a threshold (e.g., a spectral threshold). A hyper-parameter that defines the interval's width may be periodically tuned for better performance.

Figure 5:
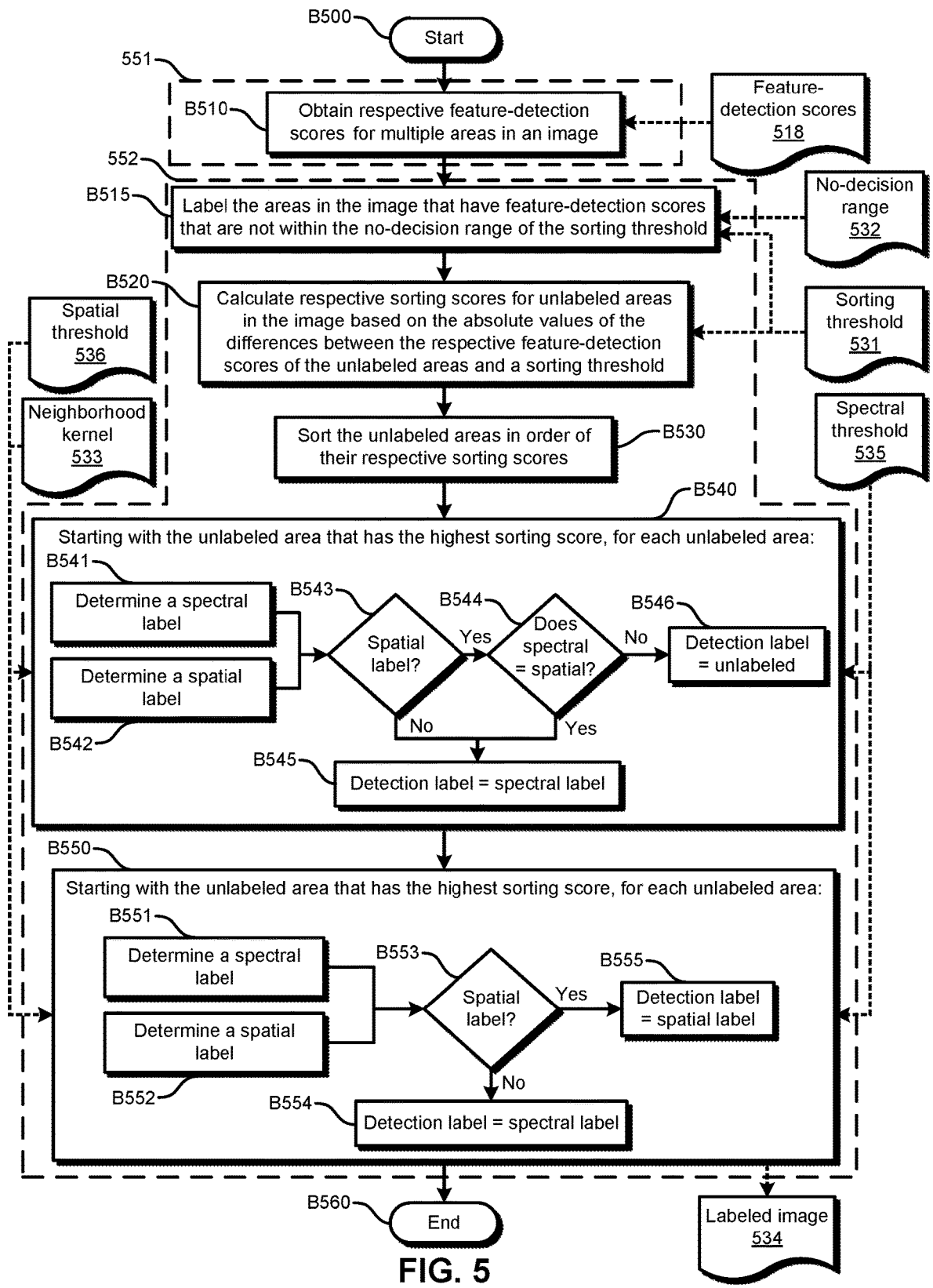
FIG. 5 illustrates an example embodiment of an operational flow for image-feature detection.
Figure 7:
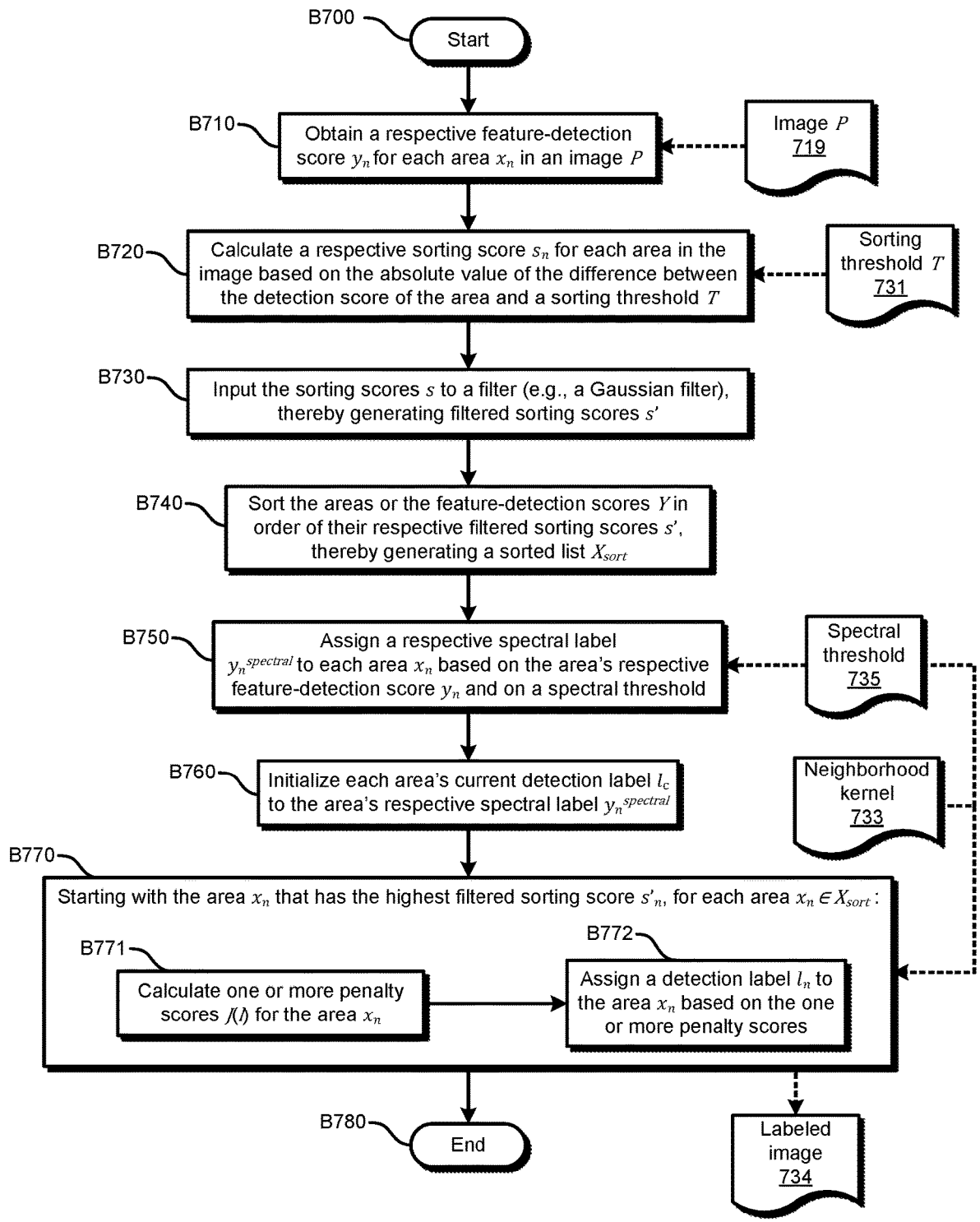
FIG. 7 illustrates an example embodiment of an operational flow for image-feature detection.

Some embodiments of the neighborhood-consistency classifier 452 implement the operations that are performed in blocks B220-B250 in FIG. 2, in blocks B520-B550 in FIG. 5, or in blocks B720-B780 in FIG. 7.

FIG. 5 illustrates an example embodiment of an operational flow for image-feature detection. The operational flow in FIG. 5 starts in block B500 and then moves to block B510, where the detection device obtains respective feature-detection scores 518 for multiple areas in an image.

Some embodiments of the detection device obtain the image (e.g., from an image-capturing device, from a storage device) and then generate (e.g., calculate) the feature-detection scores 518 based on the image, for example using one or more classifiers (e.g., a trained neural network) to generate the feature-detection scores 518. And some embodiments of the detection device obtain the feature-detection scores 518 from other devices that generated the feature-detection scores 518 based on the image.

The flow then moves to block B515, where the detection device assigns detection labels to the areas in the image that have feature-detection scores 518 that are not within a no-decision range 532 (e.g., as defined by a hyper-parameter) of a sorting threshold 531 (or another threshold). For example, if the range of the feature-detection scores 518 is 1 to 100, if the sorting threshold 531 is 50, and if the no-decision range 532 is ±25, then the detection device would assign detection labels to the areas in the image that have feature-detection scores 518 that are less than 25 or that are greater than 75.

Next, in block B520, the detection device calculates respective sorting scores for at least some of the unlabeled areas in the image. In this example embodiment, the detection device calculates the respective sorting score for an unlabeled area in the image by calculating the absolute value of the difference between the feature-detection score 518 of the area and a sorting threshold 531.

The flow then moves to block B530, where the detection device sorts the unlabeled areas in descending order of their respective sorting scores, thereby generating a sorted list of unlabeled areas.

Next, in block B540, starting with the unlabeled area in the sorted list that has the highest sorting score and moving through the unlabeled areas in the sorted list in descending order of their sorting scores, the detection device performs one or more of the operations in blocks B541-B546 for each unlabeled area. In block B541, the detection device determines a spectral label for an unlabeled area based on the feature-detection score 518 of the unlabeled area and on a spectral threshold 535.

Additionally, in block B542, the detection device determines whether to assign a spatial label to the unlabeled area based on one or more criteria (e.g., a spatial threshold 536). If the unlabeled area satisfies the one or more criteria, then the detection device assigns the spatial label to the unlabeled area. For example, in some embodiments, if the number of areas within a neighborhood (which is defined by a neighborhood kernel 533) of the unlabeled area that have the same assigned detection label exceeds a spatial threshold 536, then the detection device assigns the same detection label to the unlabeled area as the unlabeled area's spatial label. Otherwise, the detection device does not assign a spatial label to the unlabeled area. For example, in some embodiments, if there is no detection label for which the number of areas within the neighborhood of the unlabeled area that have been assigned that detection label exceeds the spatial threshold 536, then the detection device does not assign a spatial label to the unlabeled area.

From blocks B541 and B542, the flow moves to block B543. In block B543, the detection device determines if a spatial label has been assigned to the unlabeled area. If the detection device determines that a spatial label has not been assigned to the unlabeled area (block B543=No), then the flow moves to block B545, where the detection device assigns the spectral label to the unlabeled area as the unlabeled area's detection label.

If in block B543 the detection device determines that a spatial label has been assigned to the unlabeled area (block B543=Yes), then the flow moves to block B544. In block B544, the detection device determines whether the spectral label of the unlabeled area is identical to the spatial label of the unlabeled area. If they are identical (block B544=Yes), then the flow moves to block B545. If they are not identical (block B544=No), then the flow moves to block B546. In block B546, the detection device leaves the detection label of the unlabeled area as unlabeled, or the detection device assigns an "unlabeled" or null label to the area.

After block B540, the flow proceeds to block B550. In block B550, starting with the remaining unlabeled area that has the highest sorting score and moving through the other remaining unlabeled areas in descending order of sorting scores, the detection device performs one or more of the operations in blocks B551-B555 for each unlabeled area.

In block B551, the detection device determines a spectral label for the unlabeled area based on the feature-detection score 518 of the unlabeled area and on the spectral threshold 535. Also, the detection device may omit block B551 and reuse the spectral label of block B541 for the unlabeled area.

Additionally, in block B552, the detection device determines whether to assign a spatial label to the unlabeled area based on one or more criteria (e.g., a spatial threshold 536). If the unlabeled area satisfies the one or more criteria, then the detection device assigns the spatial label to the unlabeled area. For example, in some embodiments, if the number of areas within a neighborhood of the unlabeled area that have been assigned the same detection label exceeds a spatial threshold 536, then the detection device assigns that same detection label to the unlabeled area as the spatial label. Otherwise, the detection device does not assign a spatial label to the unlabeled area. For example, in some embodiments, if there is no detection label for which the number of areas within the neighborhood of the unlabeled area that have been assigned that detection label exceeds the spatial threshold 533, then the detection device does not assign a spatial label to the unlabeled area.

From blocks B551 and B552, the flow moves to block B553. In block B553, the detection device determines if a spatial label has been assigned to the unlabeled area. If the detection device determines that a spatial label has not been assigned to the unlabeled area (block B553=No), then the flow moves to block B554, where the detection device assigns the spectral label to the unlabeled area as the unlabeled area's detection label. If the detection device determines that a spatial label has been assigned to the unlabeled area (block B553=Yes), then the flow moves to block B555, where the detection device assigns the spatial label to the unlabeled area as the unlabeled area's detection label.

Finally, the detection device outputs a labeled image 534 that includes the assigned detection labels. Following block B550, the flow ends in block B560.

In some embodiments, the detection device implements the operations in block B510 in a defect classifier 551, and the detection device implements the operations in blocks B515-B550 in a neighborhood-consistency classifier 552.

FIG. 6A illustrates an example embodiment of a part of an image that includes forty-nine areas, as well as the respective feature-detection scores of the areas. In this embodiment, the thirteen areas that have feature-detection scores that do not fall within a no-decision range are highlighted. In this example, the no-decision range is 20-80, which can be described as 50±30.

FIG. 6B illustrates an example embodiment of the labels that are assigned to the areas from FIG. 6A that have feature-detection scores that fall outside the no-decision range.

FIG. 6C illustrates an example embodiment of a list of the unlabeled areas from FIG. 6B, in which the unlabeled areas have been sorted according to the absolute values of the differences between their respective feature-detection scores and a threshold of 50.

FIG. 6D illustrates an example embodiment of labels that have been assigned to the first five areas in the list in FIG. 6C after the first five iterations of the operations in block B540. In this embodiment, "N" indicates normal, "A" indicates abnormal, and blank indicates unlabeled.

FIG. 7 illustrates an example embodiment of an operational flow for image-feature detection. This example embodiment uses a penalty-based approach to assign detection labels, especially for areas (e.g., pixels) that are borderline cases based on their detection scores.

In some embodiments, there are penalties that apply to an area's label in the following circumstances: First, the label violates the threshold, for example through one of the following two scenarios: (1) An area has an anomaly score that is below the detection threshold, but the area is labeled as being an anomaly, and (2) an area has an anomaly score that is above the detection threshold, but the area is labeled as being normal. Second, the label disagrees with one or more neighboring-area labels.

For example, some embodiments use a penalty function that can be described by the following:

$$J(l_n) = \lambda J_S(l_n) + J_N(l_n), \quad (1)$$

where $l_n$ is the label at area $x_n$ (the n-th area), where $J_S(l_n)$ is the penalty term for the label $l_n$ not following the prescribed spectral threshold, where $J_N(l_n)$ is the penalty function for the area label not agreeing with its neighbors' labels, and where $\lambda$ is a parameter to relatively weigh the importance of the two penalty terms. In some embodiments, the parameter $\lambda$ is on the order of, or otherwise proportional to, the number of neighboring areas in the neighborhood.

In some embodiments, the first term, $J_S$, can be described by the following:

$$J_S(l_n) = [\delta(y_n > t)\delta(l_n = \text{Normal}) + \delta(y_n \le t)\delta(l_n = \text{Abnormal})] \quad (2)$$
$$\left(1 - e^{-\frac{(y_n-t)^2}{2\sigma_t^2}}\right),$$

where $\delta([\text{condition}])$ is a function that returns a 1 if the condition is true and that returns a zero if the condition is false, where $y_n$ is the detection score of the area $x_n$, and where t is a threshold (e.g., a spectral threshold). In this embodiment, a detection score $y_n$ that is higher than the (spectral) threshold t preliminarily indicates an anomaly. Thus, the first term (the term in the square brackets) is 1 only when the label is on the "wrong side" of the threshold. The last term (the term in parenthesis) makes the penalty approach 0 when the detection score $y_n$ is close to the threshold t, but increases toward 1 as the detection score $y_n$ moves further from the threshold t, thereby adding a larger penalty as the detection score $y_n$ deviates more from the threshold t. The parameter $\sigma_t^2$ controls to rate at which the second term goes to 1 as the detection score $y_n$ moves away from the threshold t.

And in some embodiments, $J_S$ can be described by the following:

$$J_S(l_n) = [\delta(y_n > t)\delta(l_n = \text{Normal}) + \delta(y_n \le t)\delta(l_n = \text{Abnormal})] |y_n - t|. \quad (3)$$

Some embodiments can be described by a smoother function where $l_n$ is coded as $-1$ for normal and $+1$ for abnormal, such as $$J_S(l_n) = \log(1 + e^{(y_n - t)l_n}). \quad (4)$$

In this embodiment and in similar embodiments, the coding of the label may take on a "soft" value continuously from $-1$ to 1. The soft labels (i.e., labels that have "soft" values) may be initialized, for example, by hard thresholding the detection scores Y with the spectral threshold or by renormalizing the detection scores Y to fit between $-1$ and $+1$ using a non-linear function.

In some embodiments, the second term, $J_N$, (the neighborhood penalty) can be described by the following:

$$J_N(l_n) = \sum_{j \in N(n)} \delta(l_n \ne l_j) e^{-\frac{(d_{nj})^2}{2\sigma_d^2}} e^{-\frac{(y_n - y_j)^2}{2\sigma_s^2}}, \quad (5)$$

where $d_{nj}$ is the distance between area $x_n$ and area $x_j$, and where $N(n)$ is the set of areas in the neighborhood of the area $x_n$. In these embodiments, the penalty score is the sum of the discord from all the areas $x_j$ that are in the neighborhood of area $x_n$—all these areas are denoted by $j \in N(n)$. The penalty applies when the areas' labels don't agree, and the amount of the penalty (e.g., penalty score) may be a function of the distance of area $x_n$ from area $x_1$ and of the difference between the detection score $y_n$ of area $x_n$ and the detection score $y$ of area $x_1$. Thus, if the neighboring detection scores are similar, but the labels are different, a higher penalty is assigned for the discord. Also, more weight is given to closer neighboring areas than those areas that are further away. In this formulation, the weight of the distance and score differences can be controlled by the parameters $\sigma_d^2$ and $\sigma_s^2$, respectively.

In some embodiments, the neighborhood penalty $J_N$ is made a soft-label problem by treating $l_n$ as a continuous number from $-1$ to 1 (from normal to abnormal). Thus, in some embodiments, $J_N$ can be described by $$J_N(l_n) = \sum_{j \in N(n)} |l_n - l_j| e^{-\frac{(d_{nj})^2}{2\sigma_d^2}} e^{-\frac{(y_n - y_j)^2}{2\sigma_s^2}} \quad (6)$$

or by $$J_N(l_n) = \sum_{j \in N(n)} (l_n - l_j) e^{-\frac{(d_{nj})^2}{2\sigma_d^2}} e^{-\frac{(y_n - y_j)^2}{2\sigma_s^2}}. \quad (7)$$

Some embodiments use the soft-label forms to perform a soft-label search, either by a grid search or through gradient descent for each region $x_n$. And some embodiments simply use hard labels of $-1$ and $+1$ to determine which gives a smaller penalty. Also, some embodiments may initially use three states ($-1$, 0, and $+1$) so that labels are assigned initially with an unsure state (zero) when making one or more initial passes through the area detection labels.

Some embodiments start with all soft labels set to zero. Others set the soft labels based at least in part on a Normal Error Function (erf) of the spectral label and the Normal erf of the threshold.

And in some embodiments, the calculation of a penalty score J for a candidate label l at area $x_n$ can be described by the following:

$$J(l) = \lambda(y_n - t)^2 \delta(l \ne l_c) + \sum_{j \in N(n)} e^{-(y_n - y_j)^2} \delta(l \ne l_j), \quad (8)$$

where $l_c$ is the detection label that is currently assigned to the area $x_n$ (e.g., a detection label that was assigned by an initialization operation), where $y_n$ is the detection score of area $x_n$, where $y_j$ is the detection score of area $x_j$, where t is the spectral threshold, where $N(n)$ is the set of areas in the neighborhood of the area $x_n$, and where $\lambda \propto |N(n)|$.

Also, the labels may be assigned to areas in order based on a distance from the threshold so that labels furthest from the threshold are assigned first by the sorted order, for example because they may be easier to assign. The operations can then work through the unassigned areas until all areas have been assigned a label. In this manner, the borderline areas will be assigned a label last, and their neighborhood will exert a greater influence than the neighborhood will on the areas that are first assigned labels.

In FIG. 7, the operational flow starts in block B700 and then moves to block B710, where the detection device obtains a respective feature-detection $y_n$ score for each area $x_n$ in an image P 719.

Some embodiments of the detection device obtain the image P 719 (e.g., from an image-capturing device, from a storage device) and then generate (e.g., calculate) the feature-detection scores Y based on the image P 719. And some embodiments of the detection device obtain the feature-detection scores Y from another device that generated the feature-detection scores Y based on the image P 719.

Next, in block B720, the detection device calculates a respective sorting score $s_n$ for each of one or more areas $x_n$ in the image P 719. In this example embodiment, the detection device calculates the respective sorting score $s_n$ for an area $x_n$ in the image P 719 by calculating the absolute value of the difference between the feature-detection score $y_n$ of the area $x_n$ and a sorting threshold T 731:

$$s_n = |y_n - T|.$$

The flow then proceeds to block B730, where the detection device inputs the sorting scores s to a low-pass filter (e.g., a Gaussian filter), thereby generating filtered sorting scores s'. The low-pass spatial filter may accept an input of an image of the sorting scores s (e.g., an image where each area is represented by its respective sorting score) and output an image of the filtered sorting scores s', at least some of which were changed, relative to the initial sorting score s, by the filter. Thus, the low-pass filter may act as a low-pass spatial filter that smooths the transitions between sorting scores in the image.

The flow then moves to block B740, where the detection device sorts the areas x or their feature-detection scores Y in descending (or ascending) order of their respective filtered sorting scores $s'_n$, thereby generating a sorted list $X_{sort}$.

Then, in block B750, the detection device assigns a respective spectral label $y_n^{spectral}$ to each area $x_n$ based on the area's respective feature-detection score $y_n$ and on a spectral threshold 735.

Next, in block B760, the detection device initializes each area's current detection label $l_c$ to the area's respective spectral label $y_n^{spectral}$. Also, some embodiments (e.g., embodiments that do not require the initialization of a detection label) omit block B760.

The flow then moves to block B770. In block B770, starting with the area $x_n$ that has the highest filtered sorting score $s'_n$ in the sorted list $X_{sort}$ and moving through the sorted list $X_{sort}$ in descending order of filtered sorting scores $s'_n$, the detection device performs the operations in blocks B771-B772 for each area $x_n$.

In block B771, the detection device calculates one or more penalty scores for the area $x_n$ based on one or more of the following: the respective candidate detection label l, the area's current respective detection label $l_c$ (if assigned), the area's detection score $y_n$, the area's sorting score $s_n$, the area's filtered sorting score $s'_n$, the detection labels $l_j$ of the other areas x in the area's neighborhood, the sorting scores s of the other areas x in the neighborhood, the filtered sorting scores s' of the other areas x in the neighborhood, and a threshold (e.g., the spectral threshold 735). The neighborhood is defined by a neighborhood kernel 733. In some embodiments, the calculation of the penalty scores can be described by one or more of equations (1)-(8).

In some embodiments, for each area $x_n$, the detection device calculates a respective penalty score $J(l_i)$ for multiple candidate detection labels l in a set L of available detection labels (for each l∈L). Thus, if the set L of available detection labels includes Z labels, then the detection device may calculate Z penalty scores J for each area $x_n$.

Next, in block B772, the detection device assigns a detection label $l_n$ to the area $x_n$ based on the one or more penalty scores J of the area $x_n$. For example, the detection device may assign the detection label l that has the lowest corresponding penalty score J(l) to the area $x_n$. For example, if 0 (e.g., indicative of normal) and 1 (e.g., indicative of abnormal) are the available detection labels l, then the detection device may assign a detection label $l_n$ to an area $x_n$ as described by the following:

if $J(0)<J(l) \Rightarrow l_n=0$, else $\Rightarrow l_n=1$.

After performing the operations in blocks B771-B772 for each area $x_n$, the detection device output a labeled image 734, and then the flow ends in block B780.

Also, some embodiments of this operational flow omit block B730 and use the sorting scores instead of the filtered sorting scores in blocks B740-B770. Additionally, some embodiments of the operational flows in FIGS. 2 and 5 include the operations of block B730.

In some embodiments, the detection device implements the operations in block B710 in a defect classifier, and the detection device implements the operations in blocks B720-B770 in a neighborhood-consistency classifier.

Figure 8:
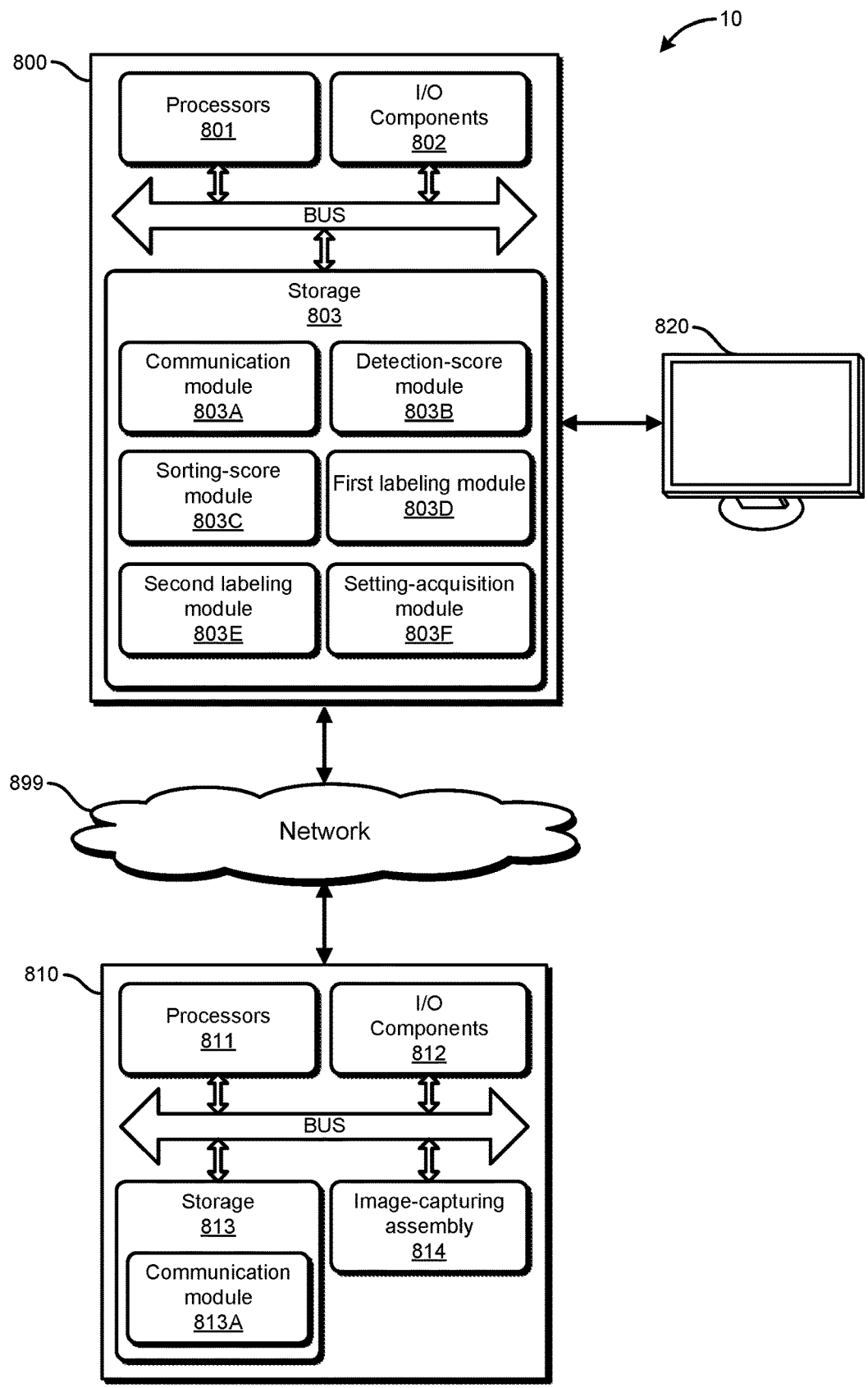
FIG. 8 illustrates an example embodiment of a system for image-feature detection.

FIG. 8 illustrates an example embodiment of a system for image-feature detection. The system 10 includes a detection device 800, which is a specially-configured computing device; an image-capturing device 810; and a display device 820. In this embodiment, the detection device 800 and the image-capturing device 810 communicate via one or more networks 899, which may include a wired network, a wireless network, a LAN, a WAN, a MAN, and a PAN. Also, in some embodiments the devices communicate via other wired or wireless channels.

The detection device 800 includes one or more processors 801, one or more I/O components 802, and storage 803. Also, the hardware components of the detection device 800 communicate via one or more buses or other electrical connections. Examples of buses include a universal serial bus (USB), an IEEE 1394 bus, a PCI bus, an Accelerated Graphics Port (AGP) bus, a Serial AT Attachment (SATA) bus, and a Small Computer System Interface (SCSI) bus.

The one or more processors 801 include one or more central processing units (CPUs), which may include microprocessors (e.g., a single core microprocessor, a multi-core microprocessor); one or more graphics processing units (GPUs); one or more tensor processing units (TPUs); one or more application-specific integrated circuits (ASICs); one or more field-programmable-gate arrays (FPGAs); one or more digital signal processors (DSPs); or other electronic circuitry (e.g., other integrated circuits). The I/O components 802 include communication components (e.g., a graphics card, a network-interface controller) that communicate with the display device 820, the network 899, the image-capturing device 810, and other input or output devices (not illustrated), which may include a keyboard, a mouse, a printing device, a touch screen, a light pen, an optical-storage device, a scanner, a microphone, a drive, and a controller (e.g., a joystick, a control pad).

The storage 803 includes one or more computer-readable storage media. As used herein, a computer-readable storage medium, in contrast to a mere transitory, propagating signal per se, refers to a computer-readable medium that includes an article of manufacture, for example a magnetic disk (e.g., a floppy disk, a hard disk), an optical disc (e.g., a CD, a DVD, a Blu-ray), a magneto-optical disk, magnetic tape, and semiconductor memory (e.g., a non-volatile memory card, flash memory, a solid-state drive, SRAM, DRAM, EPROM, EEPROM). Also, as used herein, a transitory computer-readable medium refers to a mere transitory, propagating signal per se, and a non-transitory computer-readable medium refers to any computer-readable medium that is not merely a transitory, propagating signal per se. The storage 803, which may include both ROM and RAM, can store computer-readable data or computer-executable instructions.

The detection device 800 also includes a communication module 803A, a detection-score module 803B, a sorting-score module 803C, a first labeling module 803D, a second labeling module 803E, and a setting-acquisition module 803F. A module includes logic, computer-readable data, or computer-executable instructions. In the embodiment shown in FIG. 8, the modules are implemented in software (e.g., Assembly, C, C++, C#, Java, BASIC, Perl, Visual Basic). However, in some embodiments, the modules are implemented in hardware (e.g., customized circuitry) or, alternatively, a combination of software and hardware. When the modules are implemented, at least in part, in software, then the software can be stored in the storage 803. Also, in some embodiments, the detection device 800 includes additional or fewer modules, the modules are combined into fewer modules, or the modules are divided into more modules.

The communication module 803A includes instructions that cause the detection device 800 to communicate with one or more other devices (e.g., the image-capturing device 810, the display device 820), for example to obtain one or more images from the other devices.

The detection-score module 803B includes instructions that cause the detection device 800 to obtain respective feature-detection scores for areas in an image. Some embodiments of the detection-score module 803B include instructions that cause the detection device 800 to perform the operations that are described in block B210 in FIG. 2, in block B510 in FIG. 5, or in block B710 in FIG. 7.

The sorting-score module 803C includes instructions that cause the detection device 800 to generate sorting scores for the areas in an image, to generate a sorted list of the areas in the image, or to input the sorting scores into a low-pass filter (e.g., a Gaussian filter). Some embodiments of the sorting-score module 803C include instructions that cause the detection device 800 to perform the operations that are described in blocks B220-B230 in FIG. 2, in blocks B515-B530 in FIG. 5, or in blocks B720-B740 in FIG. 7.

The first labeling module 803D includes instructions that cause the detection device 800 to assign a spectral label to an area, to assign a spatial label to an area, to determine whether to assign a detection label to an unlabeled area based on whether the area has an assigned spatial label and on the relative relationship of a spatial label and a spectral label of the area, or to initialize an area's detection label to the area's spectral label. Some embodiments of the first labeling module 803D include instructions that cause the detection device 800 to perform the operations that are described in block B240 in FIG. 2, in block B540 in FIG. 5, or in blocks B750-B760 in FIG. 7.

The second labeling module 803E includes instructions that cause the detection device 800 to assign a spectral label to an unlabeled area, to assign a spatial label to an unlabeled area, to assign a detection label to an unlabeled area based on whether the unlabeled area has an assigned spatial label and based on a spectral label for the area, to calculate penalty scores for an area, and to assign a detection label to an area based on the penalty scores of the area. Some embodiments of the second labeling module 803E include instructions that cause the detection device 800 to perform the operations that are described in block B250 in FIG. 2, in block B550 in FIG. 5, or in block B770 in FIG. 7.

Also, in some embodiments, the detection-score module 803B is implemented in a defect classifier, and the sorting-score module 803C, the first labeling module 803D, and the second labeling module 803E are implemented in a neighborhood-consistency classifier.

The setting-acquisition module 803F includes instructions that cause the detection device 800 to generate or otherwise obtain one or more settings, for example a threshold for a sorting score (e.g., the sorting threshold T 231 in FIG. 2, the sorting threshold 531 in FIG. 5, the sorting threshold T 731 in FIG. 7), a threshold for a spectral label (e.g., the spectral threshold 235 in FIG. 2, the spectral threshold 535 in FIG. 5, the spectral threshold 735 in FIG. 7), a threshold for a spatial label (e.g., the spatial threshold 236 in FIG. 2, the spatial threshold 536 in FIG. 5), a no-decision range (e.g., the no-decision range 532 in FIG. 5), and a neighborhood kernel (e.g., the neighborhood kernel 233 in FIG. 2, the neighborhood kernel 533 in FIG. 5, the neighborhood kernel 733 in FIG. 7).

The image-capturing device 810 includes one or more processors 811, one or more I/O components 812, storage 813, a communication module 813A, and an image-capturing assembly 814. The image-capturing assembly 814 includes one or more image sensors and may include one or more lenses and an aperture. The communication module 813A includes instructions that, when executed, or circuits that, when activated, cause the image-capturing device 810 to capture an image, receive a request for an image from a requesting device, retrieve a requested image from the storage 813, or send a retrieved image to the requesting device (e.g., the detection device 800).

At least some of the above-described devices, systems, and methods can be implemented, at least in part, by providing one or more computer-readable media that contain computer-executable instructions for realizing the above-described operations to one or more computing devices that are configured to read and execute the computer-executable instructions. The systems or devices perform the operations of the above-described embodiments when executing the computer-executable instructions. Also, an operating system on the one or more systems or devices may implement at least some of the operations of the above-described embodiments.

Furthermore, some embodiments use one or more functional units to implement the above-described devices, systems, and methods. The functional units may be implemented in only hardware (e.g., customized circuitry) or in a combination of software and hardware (e.g., a microprocessor that executes software).

The scope of the claims is not limited to the above-described embodiments and includes various modifications and equivalent arrangements. Also, as used herein, the conjunction "or" generally refers to an inclusive "or," though "or" may refer to an exclusive "or" if expressly indicated or if the context indicates that the "or" must be an exclusive "or."

The invention claimed is:

1. A device comprising:
one or more non-transitory computer-readable storage media; and
one or more processors that are configured to cause the device to perform operations including:
obtaining respective corresponding feature-detection scores for a plurality of areas in an image;
calculating respective corresponding sorting scores for at least some areas of the plurality of areas, wherein each sorting score of the sorting scores is based on a difference between a sorting threshold and a corresponding feature-detection score, of the corresponding feature-detection scores, of a corresponding area, of the at least some areas;
for the at least some areas of the plurality of areas, arranging the corresponding feature-detection scores in order of the corresponding sorting scores, thereby generating an order of sorted feature-detection scores; and
assigning respective detection scores to the at least some areas based on the order of sorted feature-detection scores and on two or more of the following: the respective corresponding feature-detection scores of the at least some areas, a spectral threshold, a spatial threshold, and a neighborhood kernel.

2. The device of claim 1, wherein assigning the respective detection scores to the at least some areas further comprises:
starting with the feature-detection score that corresponds to a highest sorting score of the sorting scores and then advancing to a next feature-detection score in the order of sorted feature-detection scores, performing the following for each feature-detection score:
based on the feature-detection score, the spectral threshold, the spatial threshold, and the neighborhood kernel, either
(i) assigning a detection label to the corresponding area of the feature-detection score, or (ii) not assigning a detection label to the corresponding area of the feature-detection score.

3. The device of claim 2, wherein assigning the respective detection scores to the at least some areas further comprises:
starting with the feature-detection score that corresponds to a highest sorting score that corresponds to a respective area of the at least some areas that does not have an assigned detection label and then advancing, in the order of sorted feature-detection scores, to a next feature-detection score that corresponds to a next-highest sorting score that corresponds to a respective area of the at least some areas that does not have an assigned detection label, performing the following for each feature-detection score:
based on the feature-detection score, the spectral threshold, the spatial threshold, and the neighborhood kernel, either
(i) assigning a spectral label to the corresponding area of the feature-detection score as a detection label of the corresponding area, or
(ii) assigning a spatial label to the corresponding area of the feature-detection score as a detection label of the corresponding area.

4. The device of claim 2, wherein either (i) assigning a detection label to the corresponding area of the feature-detection score, or (ii) not assigning a detection label to the corresponding area of the feature-detection score further comprises:
determining a spectral label for the corresponding area based on the corresponding feature-detection score of the corresponding area and on the spectral threshold.

5. The device of claim 1, wherein each sorting score of the sorting scores is further based on an absolute value of the difference between the sorting threshold and the corresponding feature-detection score of the corresponding area.

6. The device of claim 1, wherein the operations further include:
assigning respective corresponding detection labels to one or more areas in the plurality of areas that have corresponding feature-detection scores that do not fall within a no-decision range,
wherein the at least some areas of the plurality of areas do not include the one or more areas in the plurality of areas that have the corresponding feature-detection scores that do not fall within the no-decision range.

7. The device of claim 1, wherein a detection score indicates one of the following: a normal area, a defect area, an outlier area, and an anomalous area.

8. A method comprising:
obtaining respective corresponding feature-detection scores for a plurality of areas in an image;
calculating respective corresponding sorting scores for at least some areas of the plurality of areas, wherein each sorting score of the sorting scores is based on a difference between a sorting threshold and a corresponding feature-detection score, of the corresponding feature-detection scores, of a corresponding area, of the at least some areas;
sorting the corresponding feature-detection scores of the at least some areas in order of their respective corresponding sorting scores, thereby generating a list of sorted feature-detection scores; and
assigning respective detection labels to the at least some areas based on the list of sorted feature-detection scores and on two or more of the following: the respective corresponding feature-detection scores of the at least some areas, a spectral threshold, a spatial threshold, and a neighborhood kernel.

9. The method of claim 8, further comprising:
generating the corresponding feature-detection scores for the plurality of areas in the image using a continuous-output classifier.

10. The method of claim 8, wherein a first feature-detection score in the list of sorted feature-detection scores corresponds to a highest sorting score.

11. The method of claim 8, wherein assigning the respective detection labels to the at least some areas comprises:
assigning one or both of a spectral label and a spatial label to each of the at least some areas.

12. The method of claim 11, wherein assigning the respective detection labels to the at least some areas further comprises:
in a case where an area of the at least some areas has been assigned both a respective spatial label and a respective spectral label, determining whether the spectral label is identical to the spatial label.

13. The method of claim 11, wherein assigning the respective detection labels to the at least some areas further comprises:
in a case where an area of the at least some areas has been assigned a respective spectral label and not a respective spatial label, assigning the spectral label to the area as a detection label, of the respective detection labels, of the area.

14. The method of claim 8, wherein assigning the respective detection labels to the at least some areas comprises:
calculating respective penalty scores for the at least some areas based, at least in part, on the following: the respective corresponding feature-detection scores of the at least some areas, the spectral threshold, and the neighborhood kernel.

15. One or more non-transitory computer-readable storage media storing computer-executable instructions that, when executed by one or more computing devices, cause the one or more computing device to perform operations comprising:
obtaining respective corresponding feature-detection scores for a plurality of areas in an image;
calculating respective corresponding sorting scores for at least some areas of the plurality of areas, wherein each sorting score of the sorting scores is based on a difference between a sorting threshold and a corresponding feature-detection score, of the corresponding feature-detection scores, of a corresponding area, of the at least some areas;
sorting the corresponding feature-detection scores of the at least some areas in order of their corresponding sorting scores, thereby generating a list of sorted feature-detection scores; and
assigning respective detection labels to the at least some areas based on the list of sorted feature-detection scores and on two or more of the following: the respective corresponding feature-detection scores of the at least some areas, a spectral threshold, a spatial threshold, and a neighborhood kernel.

16. The one or more non-transitory computer-readable storage media of claim 15, wherein assigning respective detection labels to the at least some areas further comprises:
assigning a respective spectral label to each of the at least some areas based on the respective corresponding feature-detection scores of the at least some areas and on the spectral threshold.

17. The one or more non-transitory computer-readable storage media of claim 15, wherein each sorting score of the sorting scores is further based on an absolute value of the difference between the sorting threshold and the corresponding feature-detection score of the corresponding area.

18. The one or more non-transitory computer-readable storage media of claim 15, wherein assigning the respective detection labels to the at least some areas comprises:
    calculating respective penalty scores for the at least some areas based at least in part on the respective corresponding feature-detection scores of the at least some areas, on the spectral threshold, and on the neighborhood kernel.

19. The one or more non-transitory computer-readable storage media of claim 18, wherein assigning the respective detection labels to the at least some areas comprises:
    assigning respective initial labels to the at least some areas based on the respective corresponding feature-detection scores of the at least some areas and on the spectral threshold,
    wherein calculating the respective penalty scores for the at least some areas is based on the respective initial labels.

\* \* \* \* \*